United States Patent [19]

Neail et al.

[11] Patent Number: 4,675,895
[45] Date of Patent: Jun. 23, 1987

[54] TEST ADAPTER TOOLS FOR TELEPHONE CUTOVER SYSTEM

[75] Inventors: William R. Neail, York; Robert L. Bender, Jefferson, both of Pa.

[73] Assignee: Telephony Progress, Inc., York, Pa.

[21] Appl. No.: 870,910

[22] Filed: Jun. 5, 1986

[51] Int. Cl.⁴ .............................................. H04M 3/28
[52] U.S. Cl. ...................................... 379/16; 379/19; 379/326; 379/440; 361/426
[58] Field of Search ..................... 379/16, 19, 327, 17, 379/15, 9, 326, 428, 426, 440; 361/428, 426

[56] References Cited

U.S. PATENT DOCUMENTS 4,035,587 7/1977 Undhiem et al. ................... 379/327

Primary Examiner—Stafford D. Schreyer
Attorney, Agent, or Firm—Daniel J. O'Connor

[57] ABSTRACT

A method and apparatus of converting or cutting over from an old or existing telephone company main distribution frame to a new digital/electronic main distribution frame. A specially designed tool apparatus, which enables practice of the method, results in a cutover system wherein multiple splicing operation into a main feeder cable are avoided, such multiple splicing operations having proven to be costly and service affecting in the telephony industry. With the relatively inexpensive tool of the invention, the cutover process is greatly simplified and accomplished more efficiently.

The present invention further includes an apertured cover apparatus and a pair lifter tool adapted for use in the above system.

22 Claims, 8 Drawing Figures

TEST ADAPTER TOOLS FOR TELEPHONE CUTOVER SYSTEM

RELATED APPLICATIONS

This application is related to applicant's prior U.S. patent application Ser. No. 06/751,515 filed July 3, 1985.

BACKGROUND OF THE INVENTION

Many telephone companies in the United States and other countries are presently converting older mechanical or analog switchboard systems to the newer model electronic or digital systems. The newer electronic systems are easier to maintain, more reliable and have a much longer useful life than the older mechanical systems. The newer digital or electronic systems include computer memory functions and readily allow such desired features as automatic billing and call forwarding. Hence, there is presently a great demand in the industry by telephone companies to convert to the newer digital or electronic technology.

This invention relates to an improved method and associated apparatus for reliably and economically effecting the conversion from the older analog/mechanical telephone systems to the newer digital/electronic systems. The invention is thus a cutover or conversion method and related apparatus.

The invention further includes an apertured cover plate adapted to be fixed to the cutover apparatus and a pair lifter tool specially designed to cooperate with said cover plate to test individual pairs in the test field.

The system or method which is presently used to accomplish the above-described conversion is illustrated as prior art in FIG. 1. As shown, a new electronic main distribution frame 10 is placed on the main feeder cable line 11 by means of half-tap splices in the cable vault splicing area 12. The existing main distribution frame 15 remains in service during testing of the electronic system 10 by way of existing lines 16.

The new electronic system 10 is then tested under various call loading conditions for a period of from six to twelve months. During this rather lengthy test period, the new system 10 is appropriately programed and integrity checks such a call-through testing are made to establish reliability.

When final cutover to the new system 10 is accomplished, it then becomes necessary to remove the old system or main distribution frame 15 and such involves reentry of the splice area 12 to disengage circuit wiring. Such reentry into the cable vault splicing area 12 has proven in practice to be very costly and time consuming for service personnel to trim out the old telephone line pairs. Such reentry into the splicing area 12 may also affect telephone service since it is done manually and errors may arise which can compromise the new system's usage.

Accordingly, it is an object of the present invention to demonstrate a novel method of conversion or cutover from analog/mechanical telephone systems to digital/electronic systems.

It is further an object of the present invention to provide an apparatus which aids in the accomplishment of the above method.

It is a further object of the present invention to provide a cutover or conversion system which performs in a reliable and cost effective manner without the need for multiple splicing into a main feeder telephone cable line which creates unnecessary time delays and which may adversely affect customer service.

It is a still further object of the present invention to provide an apertured cover plate adapter and cooperating pair lifter tool assembly so that individual line pairs may be readily tested during the change-over process from old to new telephone equipment.

SUMMARY OF THE INVENTION

In the method of the invention, a single straight splice is made to place the new main distribution frame 10 into the main feeder cable 11. The old cables are removed from the splicing area as the new cables are spliced in thereby making room for other new cables.

The above method is accomplished by means of a specially designed and reusable tool by which the new main distribution frame is added to the circuit for appropriate testing without the need to enter a splicing area a second time thereby causing undue labor and expense.

By using the specially designed tool of the invention, a linkage is made between the test field of a new main distribution frame 10 to be installed and the existing or old main distribution frame 15. Thus, during the length of the test period, the old main distribution frame is used via cables 18 rather than by the old cables 16 which are removed during the splicing of cables 13 into splicing area 12. Therefore, a second entry into the splicing area 12 is avoided at the end of the test period when conversion to the new system 10 takes place. Other advantages of the invention are further disclosed hereinbelow.

In addition, and for purposes of the present application, an apertured cover plate 80, shown in FIGS. 7 and 8, is mounted to the specially designed and reusable tool 17 so that a desired pair of contact pins 20 may be lifted and held in an open position by means of a specially designed pin lifter tool 90 as is also shown in FIGS. 7 and 8.

By using the apparatus and method illustrated in FIGS. 7 and 8, convenient line pair testing capabilities are added to the cutover system.

FULL DISCLOSURE OF THE INVENTION

Figure 1:
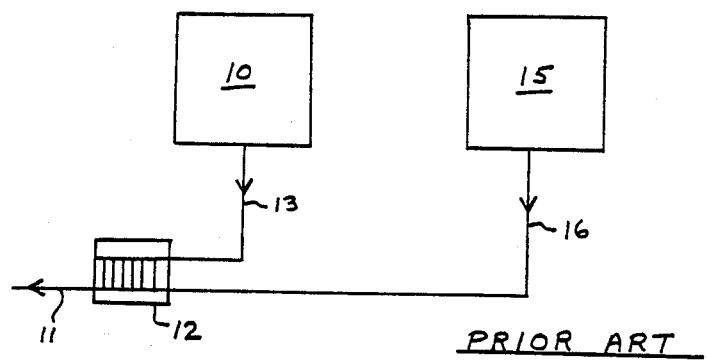
FIG. 1 shows the prior art cutover or conversion method presently in use.

Referring now to the drawings in which like numerals refer to like component parts, the prior art method of conversion now in use was previously described in the Background of the Invention and is shown in FIG. 1.

The basic problem with the prior art methodology shown in FIG. 1 is that entry into the splicing area 12 is required at two separate times during the conversion process. A first entry is required to halftap splice the new main distribution frame 10 into the splicing area 12. After a testing period of six months or more, the old main distribution frame wires 16 must be removed which requires a second separate entry into the cable vault splicing area 12. Such dual entry into the splicing area 12 results in unnecessary labor, expense, and possibility of error affecting service to telephone customers.

Figure 2:
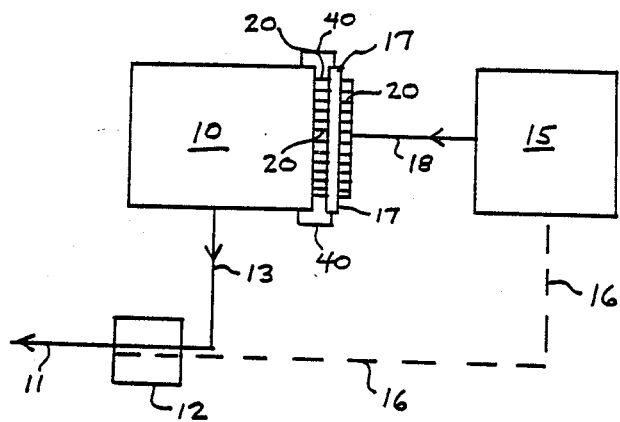
FIG. 2 illustrates the cutover or conversion method of the present invention.

In the present invention method, illustrated in FIG. 2, a specialized tool 17 is used to allow the new main disrribution frame 10 to be connected in series with the old main distribution frame 15.

The tool 17 is first linked via contact pins 20 with the test field contacts of a new main distribution frame 10 to be installed. Cables 18 from the tool 17, which have been wire wrapped around the contact pins 20 of the tool, are then run to the old main distribution frame 15.

Lines 13 from the new main distribution frame 10 are then straight spliced into the splicing area 12 of main feeder line 11 and, at the same time, the lines from the old main distribution frame 15, shown as dashed lines in FIG. 2, are removed from the splicing area 12. Thus, a dual entry into the splicing area 12 is avoided while still allowing the old main distribution frame 15 to be used in service during the six month testing of the new main distribution frame 10. Other advantages of the method are described below.

The specialized tool which allows this testing hookup of the new main distribution frame 10 is shown generally at 17 of FIG. 2 and in specific detail at FIGS. 3 to 6 of the drawings.

Figure 3:
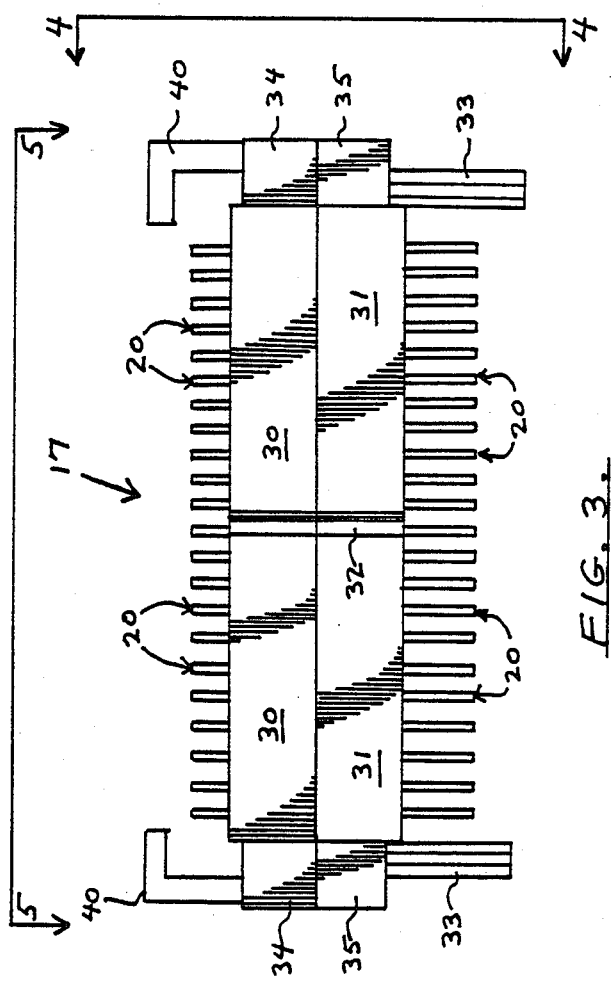
FIG. 3 shows a side elevational view of the tool used to accomplish the above method.
Figure 4:
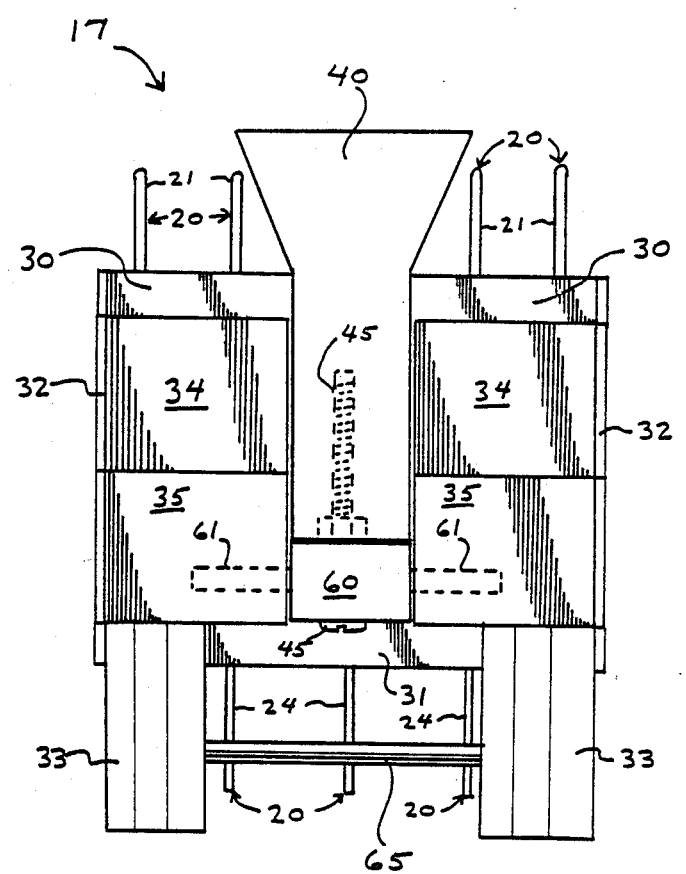
FIG. 4 shows an end elevational view of the tool also shown in FIG. 3 and viewed along lines 4—4 of FIG. 3.

As best shown in the side and end views of FIGS. 3 and 4 respectively, the tool apparatus 17 of the invention has an upper main body portion 30 and a lower main body portion 31. Both body portions are comprised of a fire retarding polyester resin and are identical to each other so that they can be appropriately joined in use.

Each of the main body portions 30 and 31 has end sections shown as indicated by numerals 34 and 35. End sections 34 and 35 serve the function of allowing a rotatable latch assembly 40 to be mounted therein. The latch assemblies 40 secure the entire tool apparatus 17 to the test field of the new main distribution frame 10 to be installed as part of the telephone system.

Figure 5:
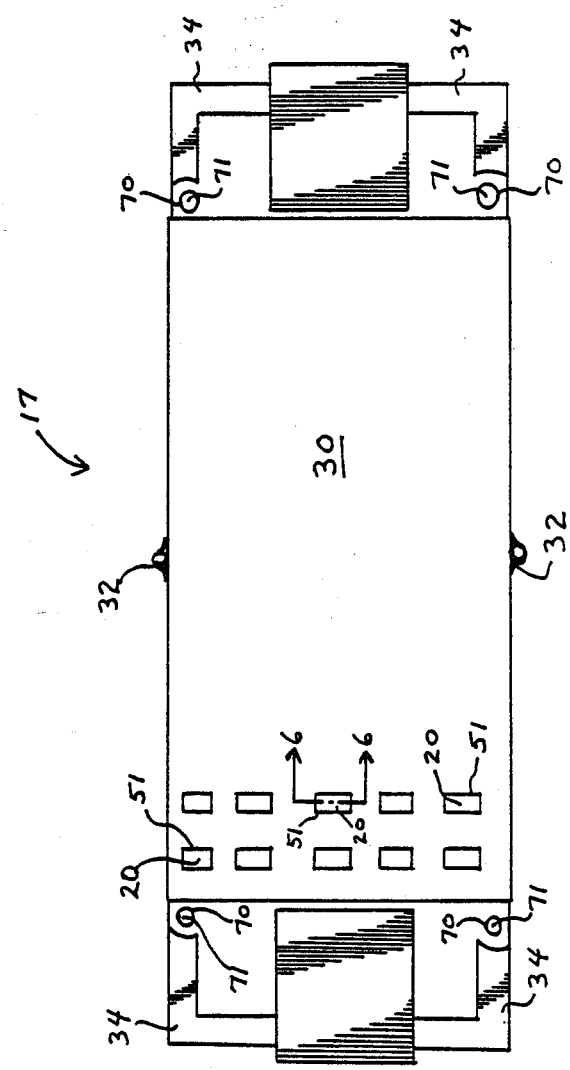
FIG. 5 is a top plan view of the tool apparatus also shown in FIGS. 3 and 4 and viewed along lines 5—5 of FIG. 3.

In practice of the invention, the upper and lower tool body portions 30 and 31 are held together by allen bolts. Numerals 32 indicate threaded apertures formed on the central lateral portions of the upper and lower bodies 30 and 31 for the appropriate use of allen bolts. End sections 34 and 35 also have apertures 70 formed therein, as shown in FIG. 5, for the receipt of joining allen bolts 71. The allen bolts 71 used in end sections 34 and 35 are threaded into spacer elements 33 and also hold bodies 30 and 31 together as stated.

As shown in FIG. 4, the latching elements 40 are mounted onto the lower end portions 35 by being bolted at 45 to a trunion element 60 having cylindrical ears 61 formed on the sides thereof. The ears 61 rest in preformed open grooves in end body portions 35 and are held in place via spacers 33 which also receive allen bolts 71 holding the upper and lower body portions, 30 and 31, together. Thus, the latch 40 is rotatable about the trunion axis formed in end body portion 35 and, once pins 20 have been placed in their appropriate contact receivers, as will be more fully described, latches 40 can be swung into the locking position of FIG. 3 to latch onto the new main distribution frame test field, then be tightened by screws 45 to keep the tool firmly in place.

A crossbar element 65 is shown in FIG. 4 as positioned between spacers 33 and serves to allow stacking of the units if desired or for the mounting of a unit cover assembly. The crossbar construction shown would also allow the mounting of a front tap shoe tester if desired to make short-term testing of telephone circuitry.

Also shown in the Figures are a plurality of pin elements 20. Each of the pin elements 20 is a onepiece assembly which, in normal position, extends through the upper and lower body sections 30 and 31. The upper section 21 of the pins 20, shown at FIGS. 4 and 6, is curved or rounded so as to more easily fit into the concave test field contacts of the new main distribution frame 10 to be installed.

As illustrated in the top view of FIG. 5, each tool 17 contains five rows and may have up to twenty columns of the pins 20. Two pin columns are shown in FIG. 5 for illustrative purposes. The shape and location of pins 20 in relation to the method and the overall tool apparatus 17 is critical to the present invention and will be more fully described with reference to FIG. 6 which is a sectional view along lines 6—6 of FIG. 5.

Figure 6:
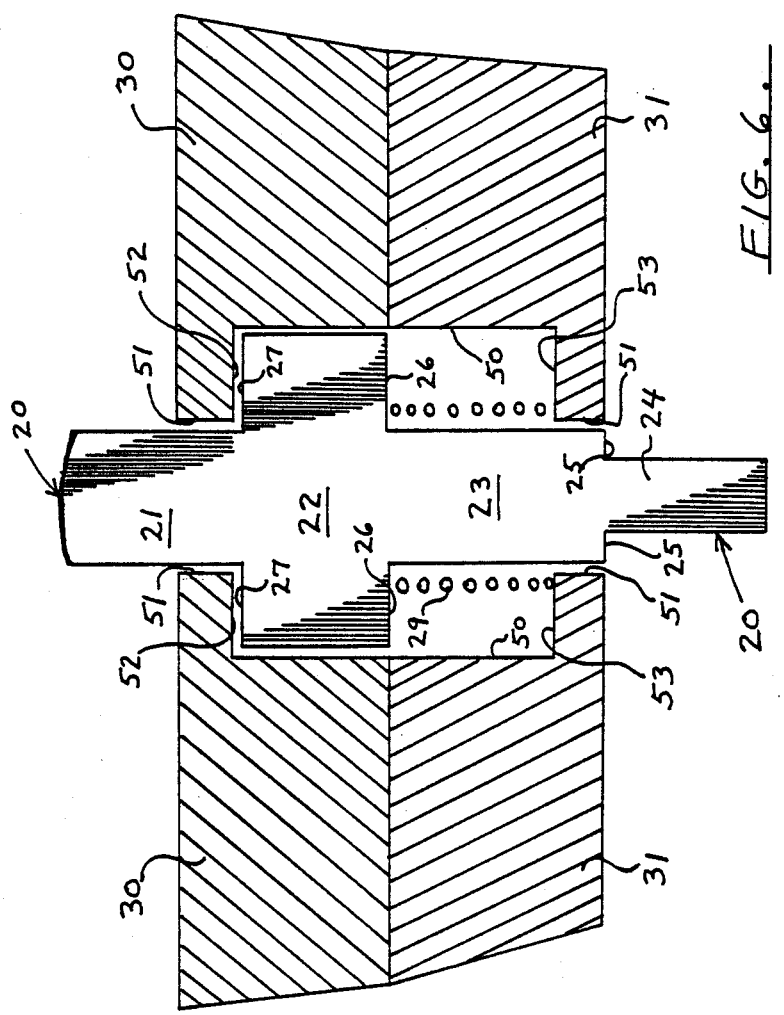
FIG. 6 is a view along lines 6—6 of FIG. 5 showing the contact pin construction and the pin chamber structure of the invention.

As shown in FIG. 6, each of the body portions 30 and 31 has pin chambers 50 formed therein for receipt of the one-piece pin elements 20. The pin chambers 50 have reduced area portions 51 at the outer edges thereof which serve as pin-retaining and spring retaining elements as will be more fully described.

As further shown in FIG. 6, each pin 20, although formed as a one-piece member, has four sections or zones as a part thereof. A first upper zone 21 is curved at its upper end so as to easily mate with the test field contacts of a new main distribution frame 10. A second zone 22 forms the widest portion of pin 20 and has upper shoulders 27 formed thereon so as to be restrained from upward motion in the pin chamber by way of the lip 52 formed as a part of the reduced pin chamber section 51. A lower part of pin zone 22 forms shoulders 26 against which an inner spring 29 abuts. A third zone 23 of each pin is of approximately the same width as the first zone 21 and serves as a spring rod portion around which spring 29 is positioned. A fourth pin zone 24 is the smallest section of pin 20 and serves as a wire wrapping end, i.e. wires or cables are wrapped around zone 24 and run to the old main distribution frame 15 shown in FIG. 2 as line 18.

Between pin zones 23 and 24, a pair of shoulders 25 are thus formed which help to prevent the operator of a wire wrapping gun from wrapping too high on the pin element 20 which may cause contact zone 21 to be held in a downward or open position. Thus, in assembly of the device, a wire wrapping gun would be used having an inner diameter to fit over pin zone 24 but not over pin zone 23. Therefore, the appropriate wire wrapping of zone 24, and only zone 24, is achieved.

A lip 53, corresponding to lip 52 previously described is located in the lower part of the pin chamber 50 lying in lower body portion 31. This lip 53, in cooperation with the aforementioned shoulders 26, serves to retain the spring 29 in its appropriate position inside the pin chamber 50 once the upper and lower body portions 30 and 31 have been secured together with allen bolts.

From the foregoing, it can be seen that when pressure is exerted on zone 21 of pin 20, as when it is being installed into the test field contacts of the new main distribution frame 10, the entire pin assembly 20 will move downward against the force of compression spring 29. The spring force will thus tend to move pin 20 back to its upper position and appropriately urge zone 21 into the desired test field contact dimples.

While the pin 20 can move downwardly from its normal position in FIG. 6 and return to the normal position under the influence of compression spring 29, pin 20 cannot move upwardly from the normal position of FIG. 6 since zone 22 abuts against lip 52. Thus, damage to the test field contacts is prevented while making the desired electrical contact.

In practice of the invention, it is contemplated that pin elements 20 would be made of nickel with the contact zone 21 being gold plated to form an effective contact with a gold plated test field of a protector block of a main distribution frame 10 to be installed.

It is important to note that the one-piece construcrion of the pin element 20 is significant since the tool of the present invention, while temporary, will still be in place as part of the telephone system for six or more months. Thus, for this extended use and to retain circuit integrity during the test period, it is important that the telephone circuit be completed through a solid pin element so that it cannot be easily damaged by line overload spike conditions caused by, for example, a lightning strike.

Testing devices known in the art to be used for a relatively short time period, e.g. one hour, which are related in overall operation to the present device are known as front tap shoes. Such devices do not typically use a solid pin element as does applicant's device but rather run telephone circuitry through a biasing spring element which may be easily compromised by such overload conditions as a lightning strike. Thus, conventional devices known as front tap shoes would not be suitable for use in the present system by reason of the long duration, e.g. six months, for which the device must be kept in place during the test and installation period of a new electronic main distribution frame 10.

Other advantages of the present cutover method and apparatus have become apparent to those of skill in the telephony arts as the system has been used and tested. For example, the single straight splicing operation in cable vault splicing area 12, described with reference to FIG. 2, avoids cable vault congestion and resulting problems during the installation period of the new main distribution frame. In the method of the invention, the old main distribution frame 15 switching equipment is operating through the new cables 13 so that any splicing mistakes in area 12 can be detected months before cutover. Thus, the new main distribution frame connections 13 are in effect pretested.

A further advantage of the present system is that call through testing of the new main distribution frame may be achieved by opening contact pins 20 of the tool 17 thus cutting out the desired cables of the old main distribution frame. Note the description below regards FIGS. 7 and 8.

Finally, the fact that a cable vault splicing area 12 does not have to be reentered a second time for cutover is of major labor and cost saving consequence to the indsutry.

Figure 7:
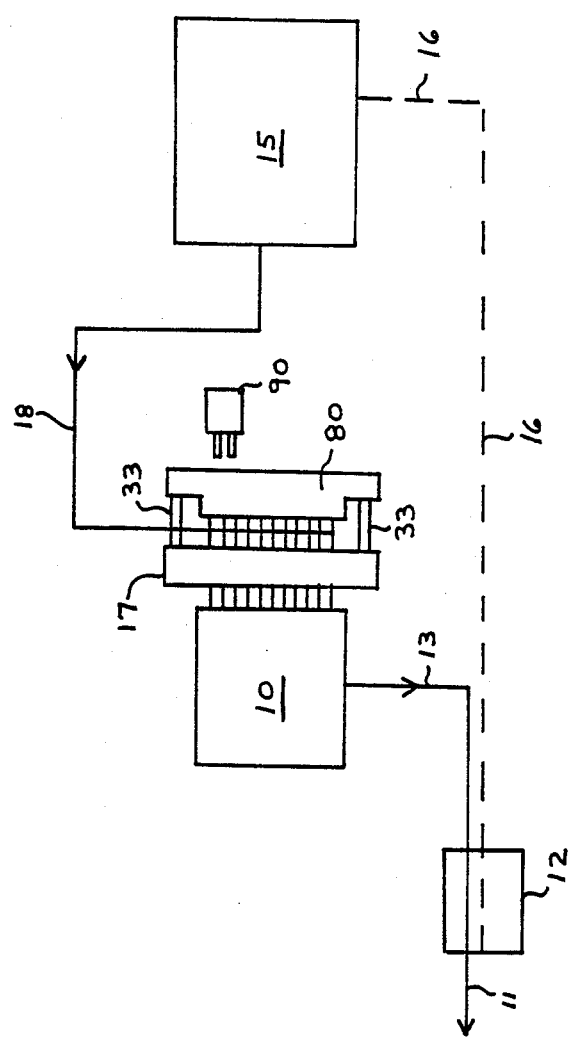
FIG. 7 is a view, similar to FIG. 2, which additionally shows the use of an apertured cover plate 80 mounted on the system for use with a pin lifter assembly 90.
Figure 8:
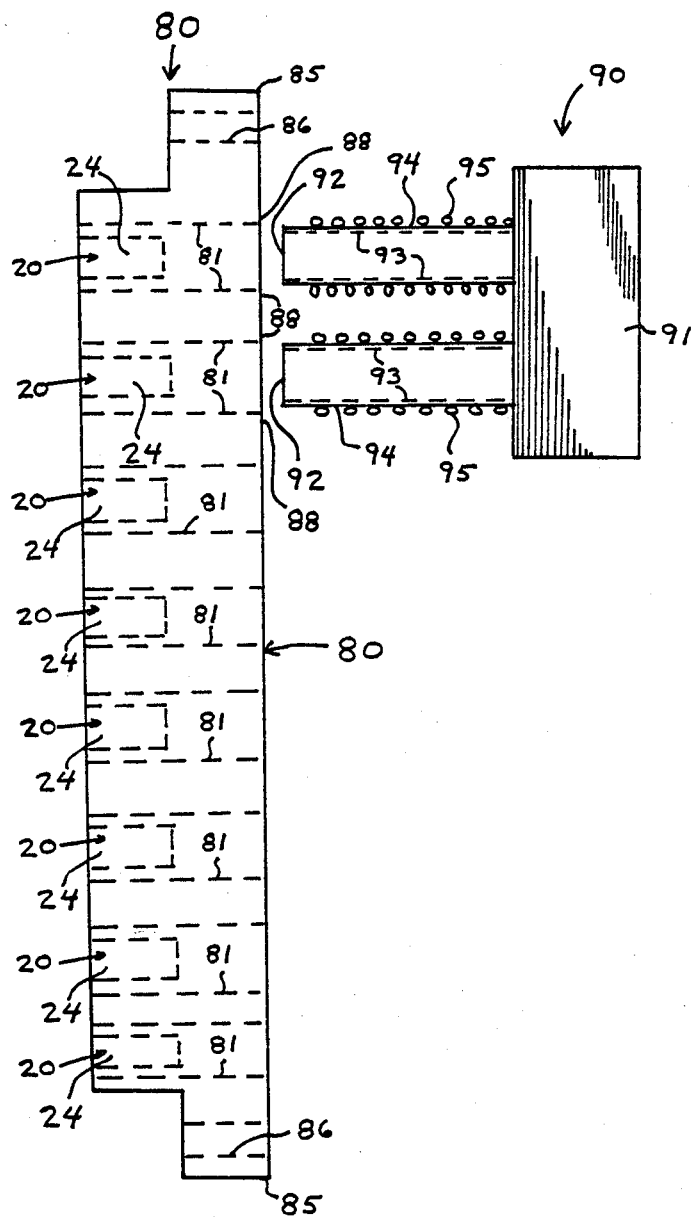
FIG. 8 illustrates the cover plate 80 and pin lifter tool 90 in further detail.

The use of the telephone equipment changeover apparatus and method disclosed herein may be further enhanced via use of the assemblies shown in FIGS. 7 and 8.

FIG. 7 is a schematic view analogous to that previously shown in FIG. 2. However, FIG. 7 shows the addition of a cover plate element 80 which is suitably mounted to tool 17 via screws in posts 33. Note that lines 18 from the old main distribution frame 15 remain connected to the pins 20 of tool 17.

Cover plate 80, as shown in FIG. 8, has apertures 81 formed therethrough such that, when mounted, the ends 24 of pins 20 extend into the apertures 81.

Cover plate 80 also has ear elements 85 formed at the edges thereof and screw-receiving apertures 86 in each ear 85 for mounting to posts 33.

The significance of the above construction is that a pin lifter tool 90 may now be advantageously utilized in the system.

Each pin lifter tool 90 has a base portion 91 with two legs 92 depending therefrom. Each leg 92 has a hollowed portion 93 of a diameter sized so as to snugly fit over the ends 24 of pins 20. The outside diameter 94 of each pin lifter leg 92 is sized so as to be slidably received in apertures 81 of cover plate 80.

Each of the pin lifter legs 92 further has compressible springs 95 mounted therearound in a fashion known generally in the mechanical arts. The diameter of springs 95 is such that they are larger than apertures 81 of cover plate 80.

The cover plate 80 and pin lifter tool 90 may thus be used with the overall system as follows. The legs 92 of pin lifter 90 are inserted into cover plate apertures 81 a distance sufficient for the hollowed apertures 93 to grasp pin sections 24, it being understood that the pin lifter legs 92 are formed of a deformable plastics material while pins 20 are made of conductive metal.

Upon the above positioning, springs 95 are compressed between the base 91 and portions 88 of the cover plate 80.

When the pin lifter 90 is then manually released, compressed springs 95 urge the pin lifter tool 90 to the right in FIG. 8, thus pulling or lifting the pin section 24 and thereby the entire pin assembly 20.

The effect of such pin lifting is to pull the desired pins 20 out of contact with the test field of the new main distribution frame 10 so that a particular desired line pair from the old equipment 15 is cut out of the circuit. Then, appropriate switches (not shown) may be closed to test the new equipment 10 to a particular telephone household.

To remove the pin lifter tool 90 from its engaging relationship with pin sections 24, the tool 90 is simply manually pulled from the apertures 81 of the cover plate 80. Pins 20 then snap back into the desired contact position in the test field of the new equipment 10.

Thus, the desired line pair testing can be achieved without the need for a parallel cutover hookup as required in the prior art systems of FIG. 1.

These and other advantages of the present system will be discovered by those of skill in the telephony arts from the specification disclosure and the claims appended hereto. The invention is not intended to be limited to the specific designs herein set forth but rather should be extended to cover related designs within the spirit and intended scope of the present invention.

I claim:

1. A method of converting from an old or existing distribution frame to a new main distribution frame in a telephone system comprising the following;

attaching a specially designed tool means (17) to a test field of the new main distribution frame (10), further attaching cables (18) from said specially designed tool means (17) to the old or existing main distribution frame (15), straight splicing cables (13) from said new main distribution frame (10) to a cable vault splicing area (12) which feeds into a main feeder cable line (11), simultaneously with the above splicing step, removing old feeder cable lines (16) which run out of the existing or old main distribution frame (15) to the cable vault splicing area (12), means whereby the new main distribution frame (10) is in series with the old main distribution frame (15) and wherein a second entry into the cable vault splicing area (12) is avoided during the converting process, attaching an apertured cover plate means (80) to said specially designed tool means (17), testing individual line pairs by utilizing a pin lifter means (90) in conjunction with said apertured cover plate means (80).

2. The method of claim 1 wherein said specially designed tool means (17) comprises:

a housing means (30, 31), pin chambers (50) contained within said housing means, a plurality of pin means (20) extending through said housing means (30, 31), means wherein a first end (21) of said pin means (20) is utilized in the method to make contact with the test field contacts of a new main distribution frame (10) to be installed, means wherein a second end (24) of said pin means (20) is utilized to make contact with an old or existing main distribution frame (15).

3. The method of claim 2 wherein said housing means comprises upper (30) and lower (31) housing portions and wherein said upper and lower housing portions are identical.

4. The method of claim 2 wherein said pin chambers (50) have reduced area portions (51) at the upper and lower ends thereof.

5. The method of claim 2 wherein said pin means (20) comprises four section or zone means (21, 22, 23, 24), a first zone means (21) being rounded at one end to provide means for insertion into a dimpled contact area of a new main distribution frame (10) to be installed, a second zone means (22) of relatively wider cross-sectional area having shoulders (27) thereon for abutting a reduced area portion (52) of the pin chamber (50), a third zone means (23) of approximately the same cross-sectional area as the first zone means (21), said third zone means (23) having space therearound for a compression spring means (29), a fourth zone means (24) of narrower cross-sectional area than said first (21) and third (23) zone means, said fourth zone means (24) being utilized as a wire wrapping area for cables (18) to be attached to an old or existing main distribution frame (15).

6. The method of claim 2 wherein said housing means includes:

upper and lower end section means (34, 35), said end section means having bolt mounting means (71) therein for holding upper and lower housing portions (30, 31) together.

7. The method of claim 6 wherein said lower end section means (35) includes means for mounting a rotatable latch (40) and trunion (60) assembly means whereby said specialized tool (17) may be mounted to the test field of a new main distribution frame to be installed.

8. The method of claim 7 wherein said bolt mounting means (71) are threaded into spacer means (33), said spacer means (33) serving to retain said trunion (60) assembly means in position in the lower end section means (35).

9. The method of claim 8 wherein said spacer means (33) have mounted therebetween crossbar means (65), said crossbar means (65) serving as a mounting bar for plural specialized tool assemblies (17) or for front tap shoe testing means.

10. The method of claim 7 wherein said rotatable latch (40) and trunion (60) assembley means includes ear means (61) mounted to the side of said trunion (60) for rotatably retaining said trunion in the lower end section means (35), and wherein said housing means (30, 31) include bolt apertures (32) for receiving mounting bolts to retain upper (30) and lower (31) housing sections together.

11. The method of claim 10 wherein said apertured cover plate means (80) is attached to said specially designed tool means (17) such that zones (24) of pins (20) extend at least partially into apertures (81) formed in said apertured cover plate means (80), and wherein said pin lifter means (90) comprises a base portion (91) and plural leg means (92) depending therefrom, each of said leg means (92) having aperture means (93) for grasping a zone (24) of said pins (20), and spring means (95) positioned around each of said leg means (92).

12. A system of components for converting from old telephone equipment (15) to new telephone equipment (10) comprising a specialized tool assembly (17), said tool comprising, a housing means (30, 31), a plurality of pin chambers (50) being formed in said housing means, a plurality of one-piece pin means (20) extending through said pin chambers (50), latch means (40) being mounted to said housing means, said latch means being utilized for mounting said tool assembly (17) to a telephone circuit, first and second means (71, 32) for holding said housing means (30, 31) together, an apertured cover plate means (80) for connection to said specialized tool assembly (17) such that one end (24) of said pin means (20) extends at least partly into said apertured cover plate means (80), a pin lifter tool assembly (90) means comprising plural leg means (92) for extension into said apertured cover plate means (80) and for grasping said one end (24) of said pin means (20).

13. The system of claim 12 wherein said housing means (30, 31) includes upper and lower end section means (34, 35), said latch means (40) being mounted for rotation in said lower end section means (35) via a trunion means (60) having ears (61) thereon and screw attachment means (45) for affixing said latch means (40) to said trunion means (60).

14. The system of claim 12 wherein said housing means includes upper and lower housing sections (30, 31) which are identical to each other.

15. The system of claim 12 wherein said pin chambers (50) have reduced area portions (51) formed at the upper and lower ends thereof.

16. The system of claim 12 said one-piece pin means (20) have at least three sections or zones (21, 22, 23) formed thereon, a first zone means (21) being utilized as a contact portion for entry into the main distribution frame circuitry of a telephone system, a second zone means (22) of relatively wider cross-sectional area than said first zone means (21), said second pin zone means (22) serving to retain the pin means (20) within the pin chamber (50) by reason of abutting contact with a reduced area portion (52) of said pin chamber, a third pin zone means (23) of approximately the same cross-sectional area as said first zone means (21), said third zone means (23) serving as a spring rod with space therearound for placement of a compression spring (29).

17. The system of claim 16 wherein said one-piece pin means (20) includes a fourth section or zone means (24), said fourth zone (24) being of narrower cross-sectional area than said first (21) and third (23) pin zones, said fourth zone means (24) serving as a wire-wrapping area whereby a cable may be run from said fourth zone means to a telephone system main distribution frame circuit.

18. The system of claim 13 wherein said first means (71) for holding said housing means (30, 31) together are located in said upper and lower end section means (34, 35) and include threaded spacer means (33) for receiving said first means (71) for holding said housing means (30, 31) together.

19. The system of claim 13 wherein said threaded spacer means (33) also serve to retain said trunion ears (61) in the desired position in the lower end section (35).

20. The system of claim 19 wherein said threaded spacer means (33) have crossbar sections (65) mounted therebetween, said crossbar sections (65) serving as a mounting means for additional tool assemblies (17) or for front tap shoe testing equipment.

21. The system of claim 12 wherein said second means (32) for holding said housing means (30, 31) together is located at a lateral position of said housing means.

22. The system of claim 21 wherein said apertured cover plate means (80) includes ear means (85) at each end for attachment to said spacer means (33) of said tool assembly (17), and wherein said pin lifter means (90) has apertures (93) formed in each of said plural leg means (92) and spring means (95) formed around each of said leg means (92) for urging said pin lifter means (90) outwardly upon grasping said pin element (20).

* * * * *